US008240359B2

(12) United States Patent
Garrett

(10) Patent No.: US 8,240,359 B2
(45) Date of Patent: Aug. 14, 2012

(54) LIQUID STORAGE AND COOLING COMPUTER CASE

(75) Inventor: Gerald Bruce Garrett, Piedmont, CA (US)

(73) Assignee: Gerald Garrett, Piedmont, CA (US)

( * ) Notice: Subject to any disclaimer, the term of this patent is extended or adjusted under 35 U.S.C. 154(b) by 1687 days.

(21) Appl. No.: 11/279,950

(22) Filed: Apr. 17, 2006

(65) Prior Publication Data

US 2007/0241648 A1 Oct. 18, 2007

(51) Int. Cl.
*F28F 7/00* (2006.01)
*F28D 15/00* (2006.01)
*F25D 23/12* (2006.01)

(52) U.S. Cl. .............. 165/80.2; 165/80.5; 165/104.33; 62/259.2; 361/698; 361/699

(58) Field of Classification Search .............. 165/10, 165/80.1, 80.2, 80.3, 80.4, 80.5, 104.33; 62/259.2; 361/679.09, 679.17, 679.27, 679.41, 361/679.47, 679.54, 687, 690, 698, 699, 361/700, 721; 347/19, 86

See application file for complete search history.

(56) References Cited

U.S. PATENT DOCUMENTS

| | | | | |
|---|---|---|---|---|
| 3,741,292 A * | 6/1973 | Aakalu et al. | ............ | 165/104.33 |
| 3,754,596 A * | 8/1973 | Ward, Jr. | ............ | 361/698 |
| 3,904,933 A * | 9/1975 | Davis | ............ | 165/80.4 |
| 4,315,300 A * | 2/1982 | Parmerlee et al. | ............ | 165/80.4 |
| 4,656,559 A * | 4/1987 | Fathi | ............ | 361/721 |
| 4,736,332 A * | 4/1988 | Crease | ............ | 361/679.09 |
| 4,980,848 A * | 12/1990 | Griffin et al. | ............ | 361/679.09 |
| 5,057,968 A * | 10/1991 | Morrison | ............ | 361/700 |
| 5,150,278 A * | 9/1992 | Lynes et al. | ............ | 165/80.3 |
| 5,333,460 A * | 8/1994 | Lewis et al. | ............ | 165/104.33 |
| 5,383,340 A * | 1/1995 | Larson et al. | ............ | 62/259.2 |
| 5,513,071 A * | 4/1996 | LaViolette et al. | ............ | 165/80.3 |
| 5,606,341 A * | 2/1997 | Aguilera | ............ | 361/699 |
| 5,634,351 A * | 6/1997 | Larson et al. | ............ | 62/259.2 |
| 5,704,212 A * | 1/1998 | Erler et al. | ............ | 361/679.47 |
| 5,757,615 A * | 5/1998 | Donahoe et al. | ............ | 361/679.47 |
| 5,818,693 A * | 10/1998 | Garner et al. | ............ | 361/700 |
| 6,031,751 A * | 2/2000 | Janko | ............ | 165/104.33 |
| 6,055,156 A * | 4/2000 | von Gutfeld | ............ | 361/690 |
| 6,076,595 A * | 6/2000 | Austin et al. | ............ | 165/104.33 |
| 6,109,039 A * | 8/2000 | Hougham et al. | ............ | 62/259.2 |
| 6,167,621 B1 * | 1/2001 | Goth et al. | ............ | 165/10 |
| 6,169,247 B1 * | 1/2001 | Craft et al. | ............ | 361/700 |
| 6,250,378 B1 * | 6/2001 | Kobayashi | ............ | 165/104.33 |
| 6,302,535 B1 * | 10/2001 | Sturgeon et al. | ............ | 347/86 |
| 6,360,813 B1 * | 3/2002 | Katoh et al. | ............ | 165/104.33 |
| 6,442,018 B1 * | 8/2002 | Dinkin | ............ | 361/679.17 |
| 6,466,438 B1 * | 10/2002 | Lim | ............ | 361/679.47 |
| 6,487,073 B2 * | 11/2002 | McCullough et al. | ... | 361/679.54 |
| 6,519,147 B2 * | 2/2003 | Nakagawa et al. | ............ | 165/80.4 |
| 6,536,510 B2 * | 3/2003 | Khrustalev et al. | ............ | 165/104.33 |
| 6,556,439 B2 * | 4/2003 | Shibasaki | ............ | 165/80.2 |
| 6,563,702 B1 * | 5/2003 | Shin et al. | ............ | 361/679.41 |
| 6,625,024 B2 * | 9/2003 | Mermet-Guyennet | ........ | 361/700 |
| 6,674,642 B1 * | 1/2004 | Chu et al. | ............ | 165/80.4 |
| 6,714,412 B1 * | 3/2004 | Chu et al. | ............ | 361/699 |
| 6,754,072 B2 * | 6/2004 | Becker et al. | ............ | 165/80.4 |
| 6,791,834 B2 * | 9/2004 | Nakagawa et al. | ............ | 165/80.4 |
| 6,833,992 B2 * | 12/2004 | Kusaka et al. | ............ | 361/699 |
| 6,840,311 B2 * | 1/2005 | Ghosh et al. | ............ | 361/700 |
| 6,845,011 B2 * | 1/2005 | Tomioka et al. | ............ | 361/699 |

(Continued)

*Primary Examiner* — Ljiljana Ciric

(57) ABSTRACT

A computer case including at least one radiator having two ends and at least one serpentine coiled tube for flowing a cooling liquid therethrough to cool a computer disposed within the case. The radiator may be made of a nonferrous metal.

10 Claims, 3 Drawing Sheets

TRANSPARENT VIEW

TOP LIQUID STORAGE TANK

OPTIONAL SECONDARY RADIATOR

PRIMARY RADIATOR

BOTTOM LIQUID STORAGE TANK

U.S. PATENT DOCUMENTS

| | | | |
|---|---|---|---|
| 6,958,911 B2 * | 10/2005 | Cader et al. | 361/699 |
| 6,987,668 B2 * | 1/2006 | Kitano et al. | 165/80.4 |
| 7,042,724 B2 * | 5/2006 | Locker | 165/104.33 |
| 7,096,928 B2 * | 8/2006 | Phillips et al. | 165/104.33 |
| 7,213,914 B2 * | 5/2007 | Anma et al. | 347/86 |
| 7,227,741 B2 * | 6/2007 | Garel et al. | 361/679.27 |
| 7,237,881 B2 * | 7/2007 | Hayasaki et al. | 347/86 |
| 7,269,005 B2 * | 9/2007 | Pokharna et al. | 361/700 |
| 7,273,089 B2 * | 9/2007 | Hata et al. | 361/699 |
| 7,303,077 B2 * | 12/2007 | Harlocker | 248/918 |
| 7,403,392 B2 * | 7/2008 | Attlesey et al. | 361/699 |
| 7,408,775 B2 * | 8/2008 | Walz et al. | 361/699 |
| 7,450,384 B2 * | 11/2008 | Tavassoli et al. | 361/699 |
| 7,502,227 B2 * | 3/2009 | Uchida et al. | 361/679.48 |
| 7,525,801 B2 * | 4/2009 | Luo | 361/700 |
| 7,532,467 B2 * | 5/2009 | Launay et al. | 165/80.3 |
| 7,639,499 B1 * | 12/2009 | Campbell et al. | 361/699 |
| 7,804,687 B2 * | 9/2010 | Copeland et al. | 165/104.33 |
| 7,864,527 B1 * | 1/2011 | Whitted | 165/104.33 |
| 2004/0001310 A1 * | 1/2004 | Chu et al. | 361/687 |
| 2004/0042171 A1 * | 3/2004 | Takamatsu et al. | 361/687 |
| 2004/0042176 A1 * | 3/2004 | Niwatsukino et al. | 361/699 |
| 2005/0207116 A1 * | 9/2005 | Yatskov et al. | 361/690 |
| 2005/0219303 A1 * | 10/2005 | Matsumoto et al. | 347/19 |
| 2006/0139422 A1 * | 6/2006 | Hatasa et al. | 347/86 |
| 2006/0244795 A1 * | 11/2006 | Hayasaki et al. | 347/86 |
| 2007/0125519 A1 * | 6/2007 | Zoodsma | 165/80.4 |

* cited by examiner

SIDE VIEW

← TOP LIQUID STORAGE TANK

← PRIMARY RADIATOR

← BOTTOM LIQUID STORAGE TANK

TOP VIEW

OPTIONAL SECONDARY RADIATOR

← TOP LIQUID STORAGE TANK

PRIMARY RADIATOR

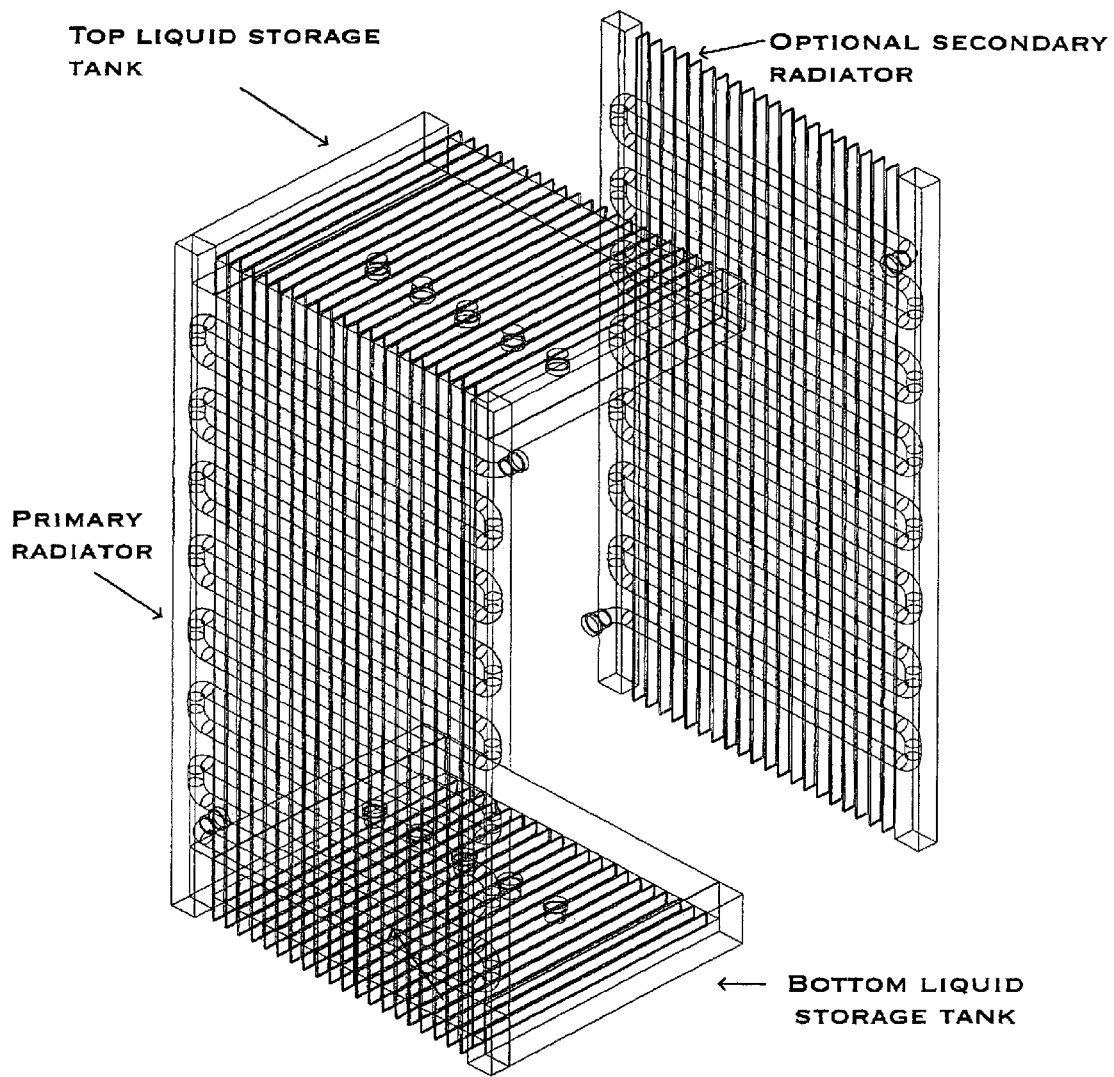

LIQUID STORAGE AND COOLING COMPUTER CASE

BRIEF DESCRIPTION OF THE DRAWINGS

FIG. 4 shows a perspective view of the present invention.

Figure 1:
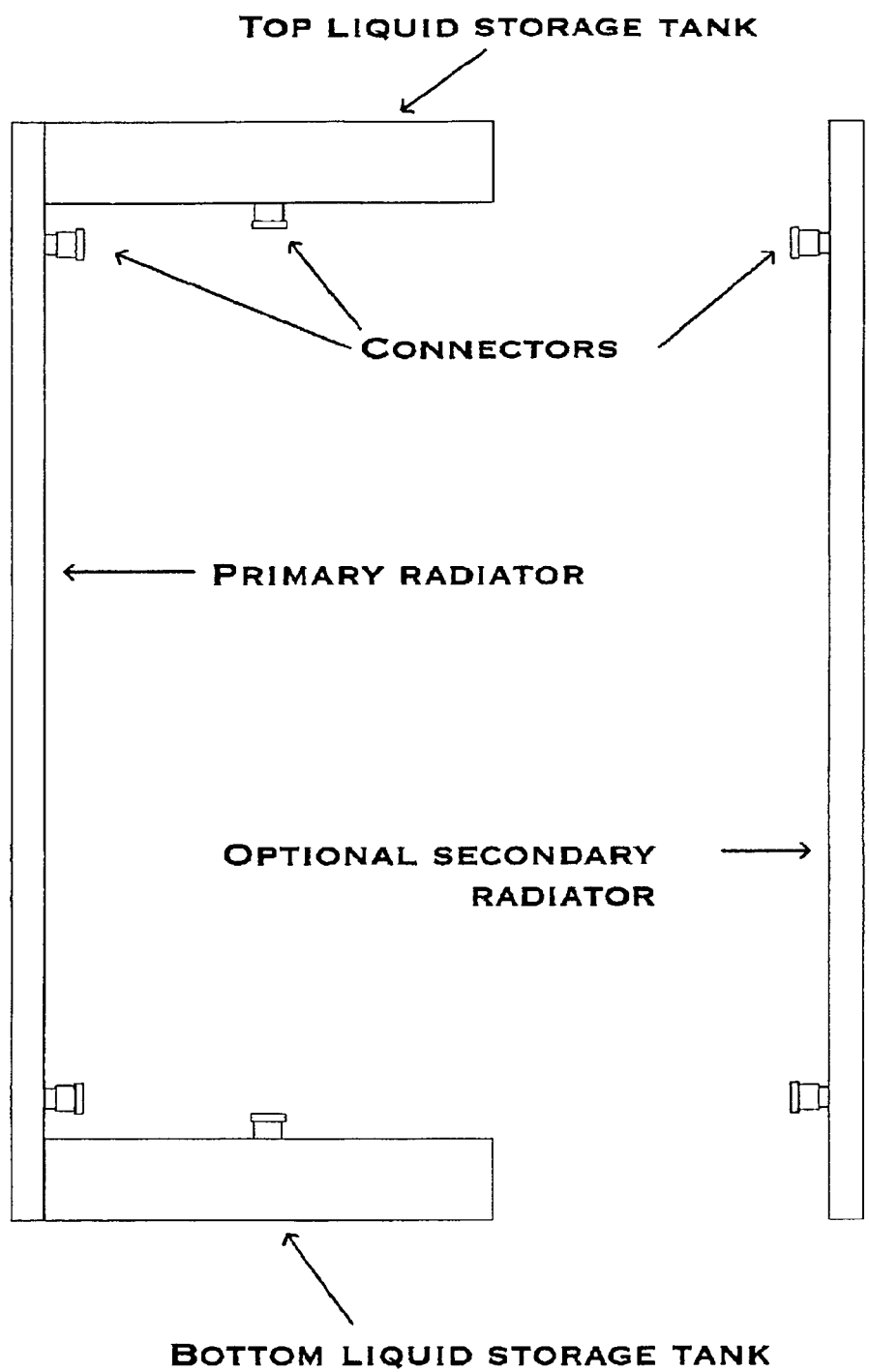
FIG. 1 shows a front view of the present invention.

DETAILED DESCRIPTION (FIG. 1) An all nonferrous metal computer case with a liquid storage tank integrated to the bottom of the case, with one outlet tubing connector for the radiator/heat exchanger and one inlet tubing connector for each heat source, And a liquid storage tank integrated to the top of the case, with one inlet tubing connector from the radiator/heat exchanger, and with one outlet tubing connector for each heat source. A radiator/heat exchanger is integrated into the side panel(s) of the case, with one inlet tubing connector at the bottom and one outlet tubing connector at the top, connected to the upper liquid storage tank. The top liquid storage tank is to have a fill cap at the highest point. This configuration can be used with a lower volume pump, and take advantage of the gravity feed to the heat source and quieter operation.

(FIG. 1) An all nonferrous metal computer case with a liquid storage tank integrated to the bottom of the case, with one inlet tubing connector, and one outlet tubing connector for each heat source, And a liquid storage tank integrated to the top of the case, with one inlet tubing connector for each heat source, and with one outlet tubing connector for the radiator/heat exchanger. The heat exchanger is integrated into the side panel(s) of the case, with one inlet tubing connector at the top and one outlet tubing connector at the bottom. The top liquid storage tank is to have a fill cap at the highest point. This reverse flow configuration can be used with a higher volume pump and will take advantage of the cooler liquid in the lower liquid storage tank.

Figure 2:
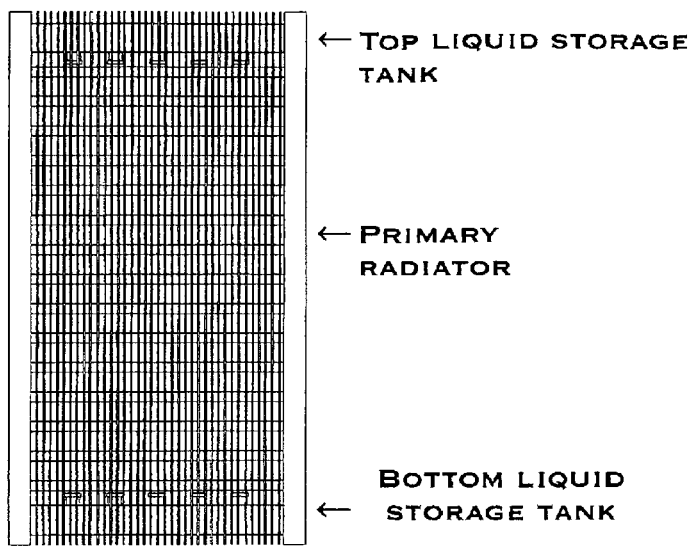
FIG. 2 shows a side elevation view of the present invention.

(FIG. 2) Each side panel of the case is also a radiator/heat exchanger. The side panels are made of nonferrous metal with pathways for liquid circulation and with heat dissipating fins. Each panel has one inlet connector at beginning of pathway for liquid and one outlet connector at an end of a pathway for liquid circulation.

Figure 3:
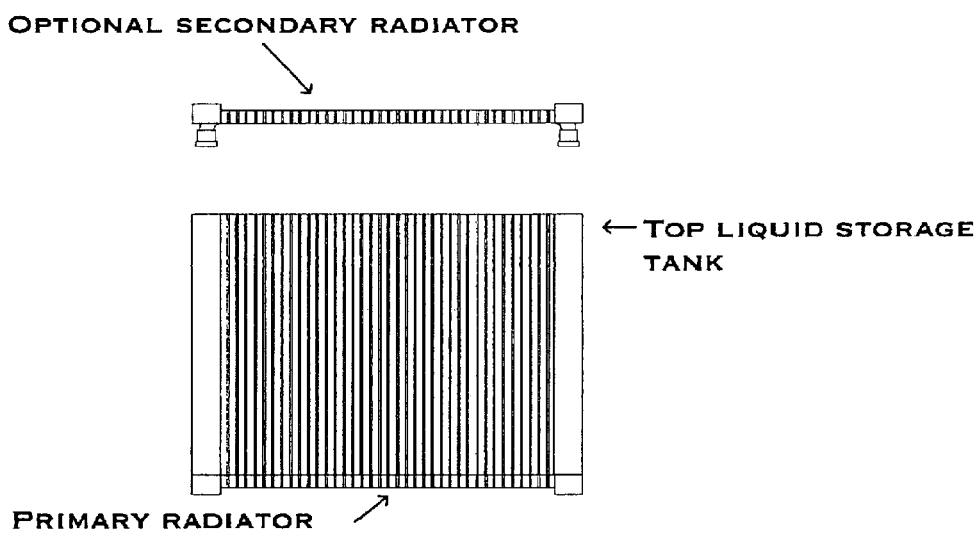
FIG. 3 shows a top plan view of the present invention.

(FIG. 3) The top of case is also a liquid storage tank made of nonferrous metal. Optional heat dissipating fins can be added to the liquid storage tank. An optional radiator/heat exchanger can be used for the other side panel of case for more heat dissipation.

(FIG. 4) The nonferrous metal body of the case is also a liquid storage and radiator/heat exchanger, wherein the case itself stores liquid in the lower and upper portion of the case and the side panel(s) of the enclosure have heat dissipating fins with pathways for liquid to circulate therethrough.

What is claimed is:

1. A computer case comprising: a primary radiator having two ends and including a first serpentine coiled tube for flowing a cooling liquid through the primary radiator, the first serpentine coiled tube having at least one connection nipple for introducing the cooling liquid into the first serpentine coiled tube; a first liquid storage tank having a first plurality of connection nipples for introducing the cooling liquid into the first liquid storage tank, the first liquid storage tank having two ends such that one of the two ends of the first liquid storage tank is attached directly to one of the two ends of the primary radiator; and, a second liquid storage tank having a second plurality of connection nipples for introducing the cooling liquid into the second liquid storage tank, the second liquid storage tank having two ends such that one of the two ends of the second liquid storage tank is attached directly to the other one of the two ends of the primary radiator.

2. The computer case as recited in claim 1, wherein the liquid coolant can be stored within the computer case to cool a computer within the case.

3. The computer case as recited in claim 2, wherein the computer case is made of a non-ferrous metal.

4. The computer case as recited in claim 1, wherein the computer case is made of a non-ferrous metal.

5. The computer case as recited in claim 1, further including a secondary radiator having two ends and including a second serpentine coiled tube for flowing the cooling liquid through the secondary radiator, the second serpentine coiled tube having at least one another connection nipple for introducing the cooling liquid into the second serpentine coiled tube.

6. The computer case as recited in claim 5, wherein the liquid coolant can be stored within the computer case to cool a computer within the case.

7. The computer case as recited in claim 5, wherein the computer case is made of a non-ferrous metal.

8. The computer case as recited in claim 5, wherein the secondary radiator is disposed such that one of the two ends of the secondary radiator is attached directly to the other of the two ends of the first liquid storage tank and such that the other of the two ends of the secondary radiator is attached directly to the other of the two ends of the second liquid storage tank.

9. The computer case as recited in claim 8, wherein the liquid coolant can be stored within the computer case to cool a computer within the case.

10. The computer case as recited in claim 8, wherein the computer case is made of a non-ferrous metal.

* * * * *